US012370659B2

(12) United States Patent
Huang

(10) Patent No.: US 12,370,659 B2
(45) Date of Patent: Jul. 29, 2025

(54) SAFETY DEVICE OF NAIL GUN

(71) Applicant: Apach Industrial Co., Ltd., Taichung (TW)

(72) Inventor: Chun-Ming Huang, Taichung (TW)

(73) Assignee: Apach Industrial Co., Ltd., Taichung (TW)

( * ) Notice: Subject to any disclaimer, the term of this patent is extended or adjusted under 35 U.S.C. 154(b) by 40 days.

(21) Appl. No.: 18/452,182

(22) Filed: Aug. 18, 2023

(65) Prior Publication Data

US 2025/0058444 A1 Feb. 20, 2025

(51) Int. Cl.
*B25C 1/04* (2006.01)
*B25C 1/00* (2006.01)

(52) U.S. Cl.
CPC ................ *B25C 1/008* (2013.01); *B25C 1/04* (2013.01)

(58) Field of Classification Search
CPC .. B25C 1/008; B25C 1/04; B25C 1/00; B25C 7/00; B25F 5/00; B27F 7/09
USPC ............................... 227/8, 29, 151, 152, 153
See application file for complete search history.

(56) References Cited

U.S. PATENT DOCUMENTS 3,900,144 A * 8/1975 Hamilton .................. B25C 7/00 227/155
5,687,897 A * 11/1997 Fa ........................... B25C 1/046 227/8
7,484,647 B2 * 2/2009 Yang ........................ B25C 1/008 227/129
9,238,298 B2 * 1/2016 Wu ........................... B25C 1/06
9,993,913 B2 * 6/2018 McCardle ................. B25C 7/00
11,446,804 B2 * 9/2022 Liu ......................... B25C 1/047
11,660,737 B2 * 5/2023 Lamb ...................... B25C 1/047 227/108
2008/0237291 A1 * 10/2008 Shao ..................... B25C 1/008 227/8
2014/0209657 A1 * 7/2014 Huang ...................... B27F 7/09 227/19
2017/0297188 A1 * 10/2017 Huang ...................... B25C 7/00
2020/0324398 A1 * 10/2020 Lamb .................... B25C 5/0292
2022/0234180 A1 * 7/2022 Liu ......................... B25C 1/008

FOREIGN PATENT DOCUMENTS

CN 112060013 * 12/2020 ............... B25C 1/00

* cited by examiner

*Primary Examiner* — Thanh K Truong
*Assistant Examiner* — Linda J. Hodge
(74) *Attorney, Agent, or Firm* — Wang Law Firm, Inc.

(57) ABSTRACT

A safety device of a nail gun has a pressing module with a pressing member and a connecting member; a pneumatic module having a vent valve and a vent tube; a clamp linkage assembly having a base, a clamp seat and a pneumatic cylinder; and a trigger module with an abutting member having abutting and pushing sections; a trigger having a passage; and a safety member; the vent valve has a body and a valve rod with one end extending into the body, another end connected to the connecting member; the clamp seat is pivotally disposed on the base and has a clamping section and an abutted section; the pneumatic cylinder has an air intake part connected to the vent tube; and a push rod provided for driving the clamp seat to pivot; the safety member is pivotally disposed on the trigger and corresponds to the passage.

15 Claims, 11 Drawing Sheets

ON

SAFETY DEVICE OF NAIL GUN

BACKGROUND

Field of Invention

The invention relates to a nail gun, and more particularly to a safety device of a nail gun.

Description of Related Art

The conventional nail guns only use the trigger to simultaneously control the clamp seat and the firing pin. The clamp seat is used to clamp a to-be-nailed object, such as board and panel. The firing pin is used to trigger nails. In other words, the pneumatic circuit of the conventional nail guns is actuated by simply pressing the trigger without any safety device, which will lead to potential risks. Therefore, a safety device of a nail gun capable of ensuring safety in use is demanded.

SUMMARY

The invention provides a safety device of a nail gun, a main object is to ensure the safety of using the nail gun.

In order to achieve the aforementioned object, the safety device of the nail gun of the invention comprises:

- a pressing module, a pneumatic module, a clamp linkage assembly, and a trigger module;
- the pressing module comprises a pressing member and a connecting member, the pressing member has a pressing section, and an extension section and a stop section;
- the connecting member has a driving end and a linkage end opposite to each other, the driving end is connected to the extension section; the pneumatic module comprises a vent valve and a vent tube, the vent tube is connected to the vent valve, the vent tube is connected to the clamp linkage assembly, the vent valve has a body and a valve rod, one end of the valve rod extends into the body, another end of the valve rod is connected to the linkage end of the connecting member, the valve rod is capable of displacing relative to the body, the vent tube is connected to the body;
- the clamp linkage assembly comprises a base, a clamp seat and a pneumatic cylinder, the clamp seat is pivotally disposed on the base, the clamp seat has a clamping section and an abutted section, the pneumatic cylinder has an air intake part and a push rod, the air intake part is connected to the vent tube, the push rod is provided for moving and abutting against the abutted section to pivot the clamp seat to cause the clamping section to approach or move away from the trigger module;
- the trigger module comprises an abutting member, a trigger and a safety member, the abutting member is capable of displacing to cause the trigger module to switch between an actuated state and a safe state, the abutting member has an abutting section and a pushing section, the abutting section can only move depending on a gravity of a tool and a force exerted by a user, the stop section is provided for moving to or moving away from a displacement path;
- the trigger has a first pivoting end and a pressing end opposite to each other, the trigger has a passage between the first pivoting end and the pressing end, the passage is closer to the first pivoting end; and
- the safety member has a second pivoting end and an abutted end opposite to each other, the second pivoting end is pivotally disposed on the trigger, a position of the abutted end corresponds to a position of the passage, when the trigger module is in the actuated state, the pushing section passes through the passage and abuts against the abutted end, when the trigger module is in the safe state, the pushing section moves away from the abutted end.

To sum up, in using the safety device of the nail gun of the invention, when the to-be-nailed object is positioned between the abutting section and the clamping section, a user must ensure to press the pressing section with one hand and press the trigger with another hand to be capable of effectively triggering the nail gun. Therefore, the user must follow safe operating procedures to ensure the safety of using the nail gun.

DETAILED DESCRIPTION

Figure 1:
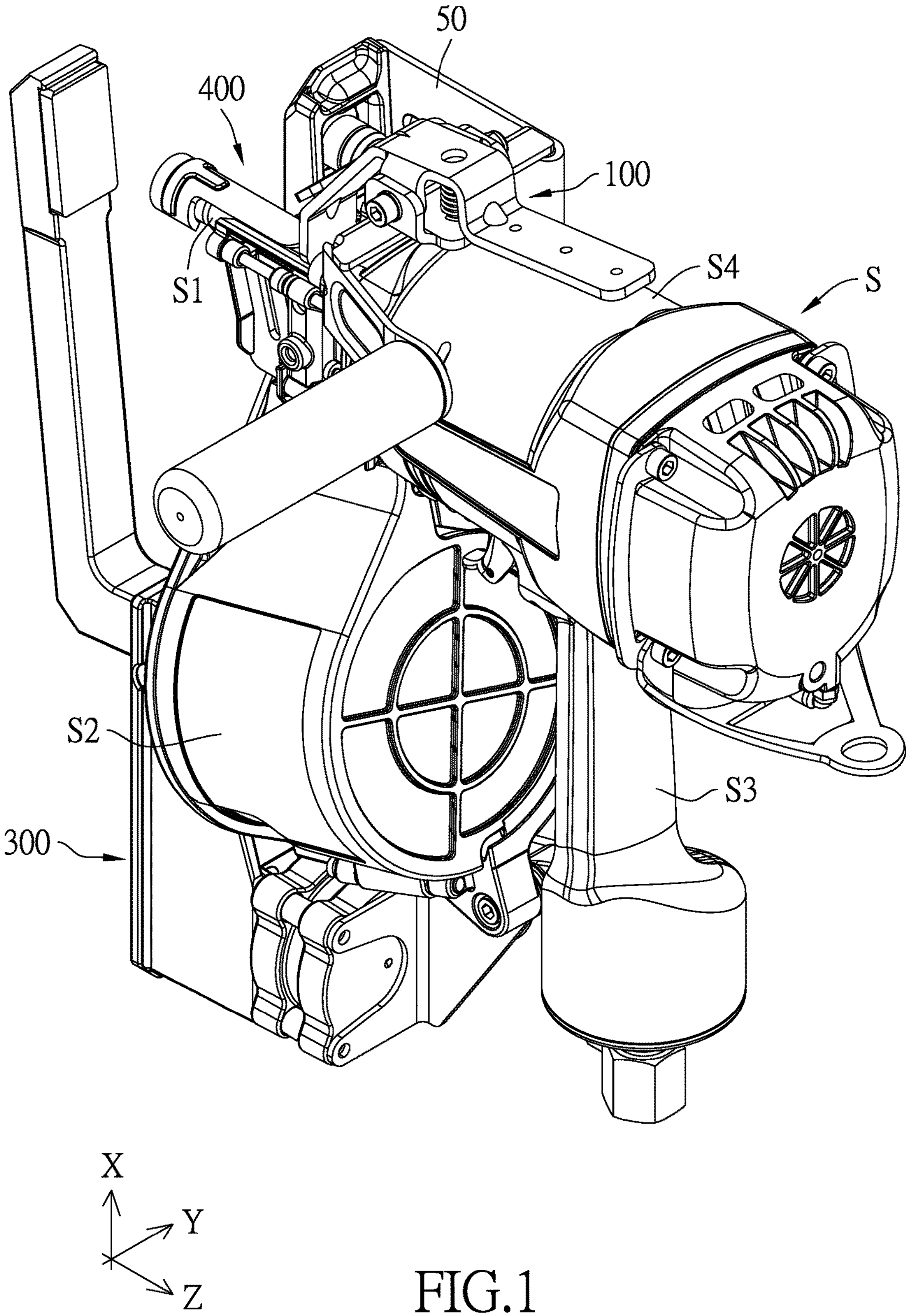
FIG. 1 is a perspective view of the safety device of a nail gun of the invention.

The invention provides the safety device of a nail gun, which is installed on a nail gun S. The nail gun S has a nozzle S1, a nail cartridge S2, a handle S3 and a cylinder shell S4.

Please refer to FIGS. 1-12. The safety device of the nail gun comprises a pressing module 100, a pneumatic module 200, a clamp linkage assembly 300 and a trigger module 400. Please refer to FIGS. 3 and 4, the pressing module 100 comprises a pressing member 110, an assembly seat 120, a connecting member 130 and an elastic member 140. The pressing member 110 has a pressing section 111, a butting section 112, an extension section 113 and a stop section 114 connected in sequence, the pressing section 111 is provided for a user to press, two opposite sides of the butting section 112 respectively extend to form a side locking part 115, and the side locking parts 115 respectively have a first lock hole 115A. Extension directions of the pressing section 111 and the butting section 112 are roughly horizontal, an extension direction of the extension section 113 is inclined compared with that of the butting section 112, an extension direction of the stop section 114 and an extension direction of the butting section 112 are roughly perpendicular to each other.

The assembly seat 120 is provided for directly or indirectly installing on the nail gun S. The assembly seat 120 has a main body 121 and two side extensions 122. The two side extensions 122 extend from two opposite sides of the main body 121 respectively. The two side extensions 122 respectively have a second lock hole 122A. The main body 121 has a protruded column 121A, the protruded column 121A faces the butting section 112, and the protruded column 121A is closer to the pressing section 111 than the two side extensions 122. The two side extensions 122 respectively abut against the two side locking parts 115, so that the second lock hole 122A is aligned with the first lock hole 115A. The assembly seat 120 further has a first bolt 123 and a first nut 124. The first bolt 123 is inserted into the two first lock holes 115A and the two second lock holes 122A and is locked with the first nut 124, so that the pressing module 100 is capable of pivoting relative to the assembly seat 120. In this embodiment, the assembly seat 120 is locked to the nail gun S through bolts.

The elastic member 140 is disposed between the main body 121 and the butting section 112. One end of the elastic member 140 is sleeved on the protruded column 121A and abuts against the main body 121. Another end of the elastic member 140 abuts against the butting section 112. The butting section 112 has a first end 112A and a second end 112B opposite to each other. The first end 112A is connected to the pressing section 111, and the second end 112B is connected to the extension section 113. The elastic member 140 is closer to the first end 112A and farther away from the second end 112B, and the elastic member 140 is closer to the first end 112A than the side locking part 115.

The connecting member 130 has a driving end 131 and a linkage end 132 opposite to each other, the driving end 131 is connected to the extension section 113, and the linkage end 132 is connected to the pneumatic module 200.

Figure 4:
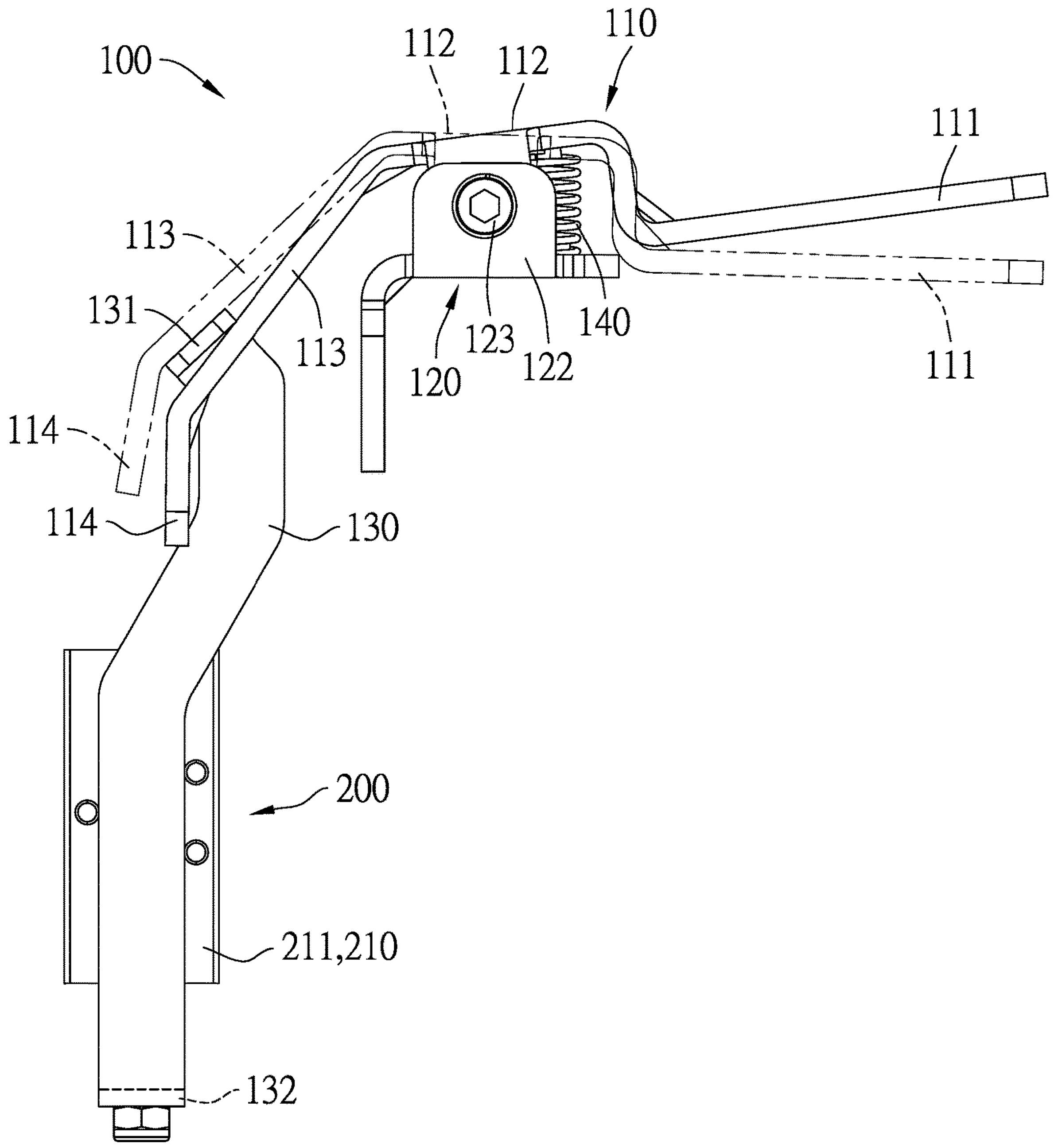
FIG. 4 is a schematic diagram of pressing the pressing module of the invention.

Please refer to FIG. 4, when the user presses the pressing section 111, the pressing member 110 rotates around the first bolt 123 as a pivot center, and compresses the elastic member 140, so that the extension section 113 and the stop section 114 are upturned, and the extension section 113 drives the connecting member 130 to upturn. On the contrary, when the user releases the pressing section 111, the elastic member 140 pushes against the pressing section 111 to rotate reversely with the first bolt 123 as a pivot center to cause the extension section 113 and the stop section 114 to move downward, and the extension section 113 drives the connecting member 130 to descend.

Figure 3:
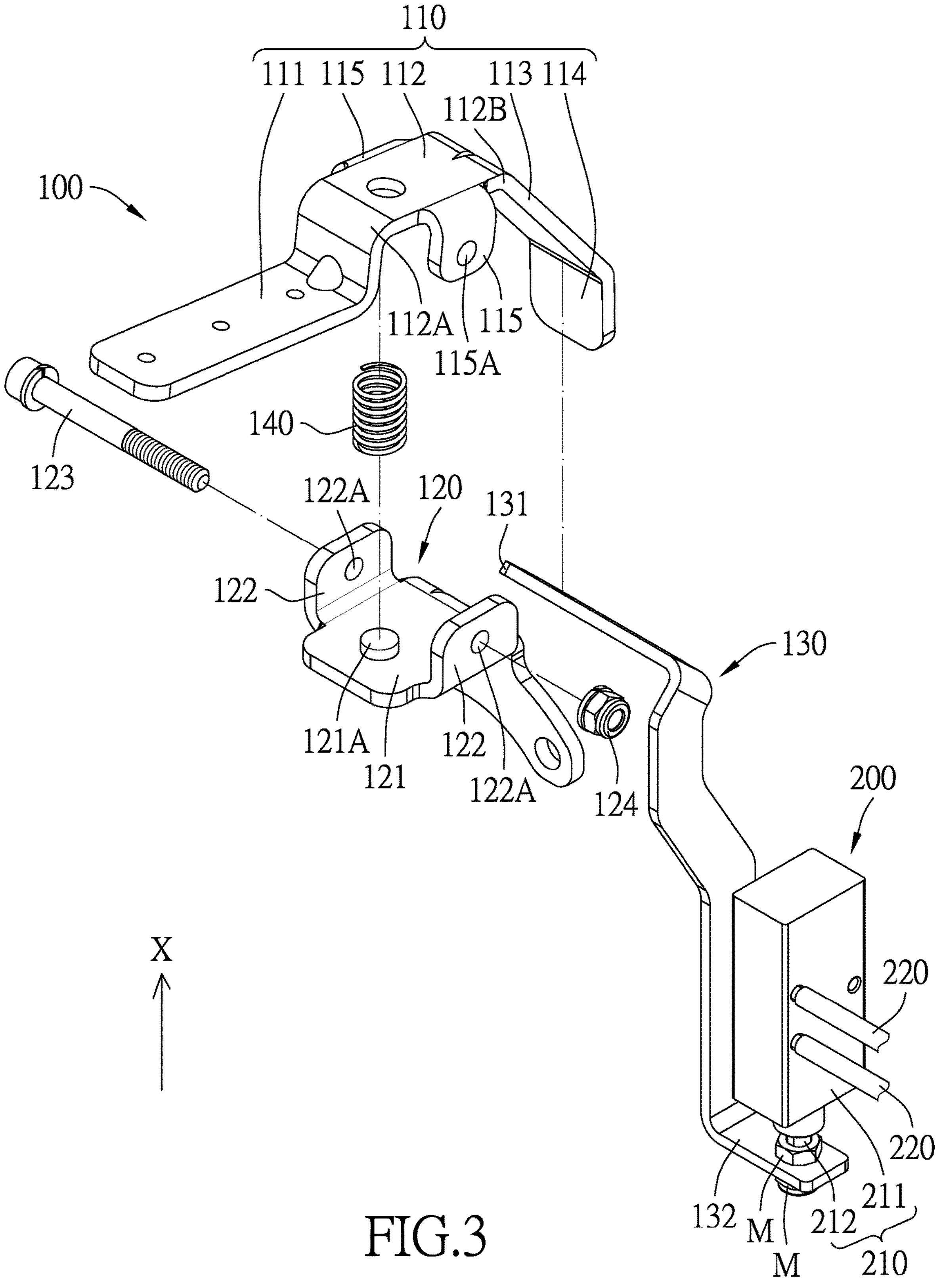
FIG. 3 is an exploded perspective view of a pressing module of the invention.

Please refer to FIG. 3, the pneumatic module 200 is provided for directly or indirectly mounted on the nail gun S. The pneumatic module 200 comprises a vent valve 210 and a vent tube 220. The vent tube 220 is connected to the vent valve 210, and the vent tube 220 is provided for connecting with an air supply source (not shown in the figure) and the clamp linkage assembly 300. The vent valve 210 is provided for controlling whether an air of the air supply source can be delivered to the clamp linkage assembly 300. The vent valve 210 is provided for directly or indirectly mounted on the nail gun S. The vent valve 210 has a body 211 and a valve rod 212, one end of the valve rod 212 extends into the body 211, and another end of the valve rod 212 is connected to the linkage end 132 of the connecting member 130. The valve rod 212 is capable of displacing along a longitudinal direction X relative to the body 211, and the connecting member 130 drives the valve rod 212 to displace along the longitudinal direction X. When the user presses the pressing section 111, the connecting member 130 upturns and drives the valve rod 212 to retract, so that the vent valve 210 is in an ON state. When the user releases the pressing section 111, the connecting member 130 descends to cause the valve rod 212 to protrude from the body 211, so that the vent valve 210 is in an OFF state. The vent tube 220 is connected to the body 211. In this embodiment, the vent tubes 220 are provided, at least one of the vent tubes 220 is provided for connecting with the air supply source, and at least one of the vent tubes 220 is connected to the clamp linkage assembly 300. In this embodiment, the linkage end 132 of the connecting member 130 is fixed to the valve rod 212 by two nuts M.

Preferably, the pneumatic module 200 is controlled in conjunction with a cylinder of the trigger module 400. The pneumatic module 200 is provided for controlling whether the air of the air supply source controls actions of the cylinder. If the vent valve 210 is in the OFF state, the cylinder will not operate, thereby preventing the nail gun S from being triggered. The pneumatic module 200 has a sequential control, a next action cannot be performed before a previous action is completed, including triggering operation, so that the cylinder of the trigger module 400 has a corresponding action.

Figure 5:
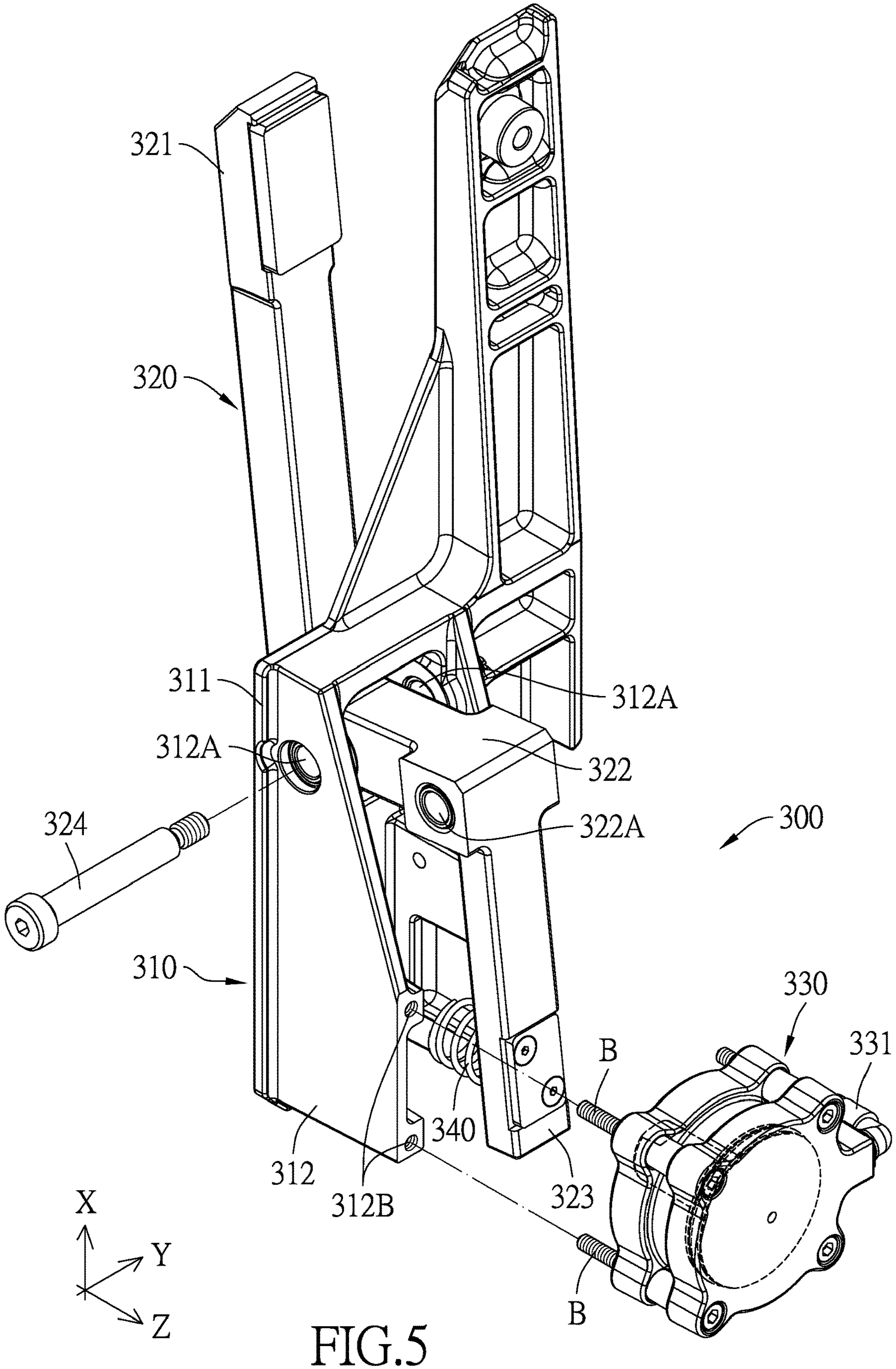
FIG. 5 is an exploded perspective view of a clamp linkage assembly of the invention.
Figure 6:
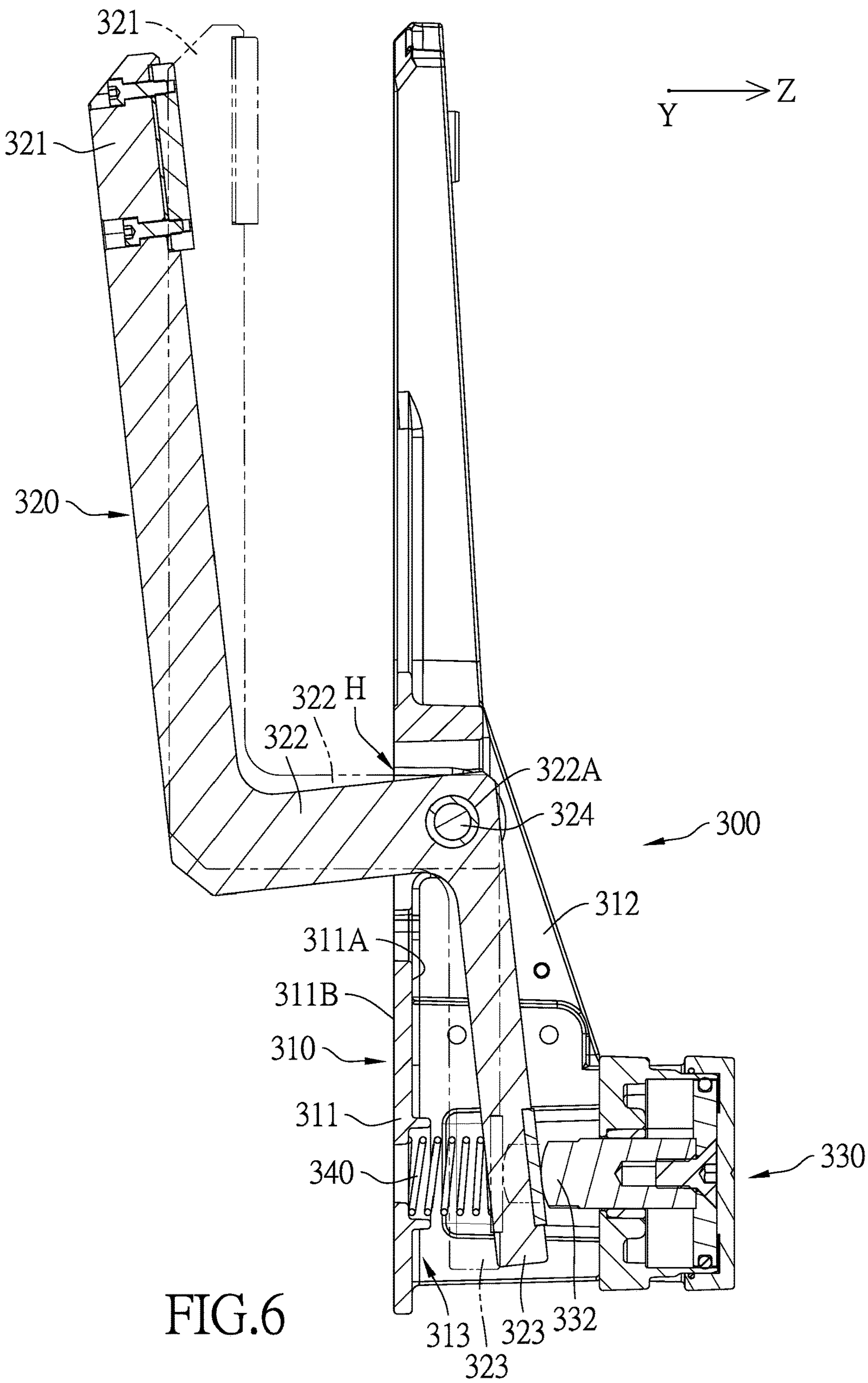
FIG. 6 is a schematic diagram of operation of the clamp linkage assembly of the invention.

Please refer to FIGS. 5 and 6. The clamp linkage assembly 300 comprises a base 310, a clamp seat 320, a pneumatic cylinder 330 and a return spring 340. The base 310 is directly or indirectly mounted on the nail gun S. The base 310 comprises a bottom plate 311 and two side walls 312. The bottom plate 311 has a through hole H. The bottom plate 311 has a top side 311A and a bottom side 311B opposite to each other. The two side walls 312 extend from the top side 311A. The two side walls 312 are arranged along a transverse direction Y. The transverse direction Y is perpendicular to the longitudinal direction X. A distance is provided between the two side walls 312. The two side walls 312 are perpendicular to the top side 311A. An accommodating space 313 is formed between the two side walls 312. The two side walls 312 respectively have an assembling hole 312A. The end of each of the two side walls 312 that is not connected to the bottom plate 311 has a plurality of screw holes 312B.

The clamp seat 320 has a clamping section 321, a connecting section 322 and an abutted section 323 sequentially connected with one another. Extending directions of the clamping section 321 and the abutted section 323 are the same. An extending direction of the connecting section 322 is perpendicular to extending directions of the clamping section 321 and the abutted section 323. The connecting section 322 extends along a height direction Z, the height direction Z is perpendicular to the longitudinal direction X and the transverse direction Y. The connecting section 322 has a pivot hole 322A, the pivot hole 322A penetrates through the connecting section 322 along the transverse direction Y, and the connecting section 322 is inserted into the through hole H. The pivot hole 322A is aligned with the two assembling holes 312A, and a pivot bolt 324 is inserted into one of the assembling holes 312A and the pivot hole 322A and is locked in the other assembling hole 312A, so that the clamp seat 320 is pivotally mounted on the base 310. The clamp seat 320 is capable of pivoting with the pivot hole 322A as a pivot center, and the abutted section 323 extends into the accommodating space 313.

The return spring 340 is disposed in the accommodating space 313, one end of the return spring 340 abuts against the top side 311A of the bottom plate 311, and another end of the return spring 340 abuts against the abutted section 323.

The pneumatic cylinder 330 is locked on the screw holes 312B by a plurality of bolts B, so that the pneumatic cylinder

330 is fixed on the two side walls 312. The pneumatic cylinder 330 has an air intake part 331 and a push rod 332. The air intake part 331 is connected to the vent tube 220. The push rod 332 is provided for abutting against the abutted section 323. The push rod 332 is capable of displacing along the height direction Z. When the vent valve 210 is in the ON state, the push rod 332 stretches out and presses against the abutted section 323, the abutted section 323 moves close to the top side 311A and compresses the return spring 340, and the clamp seat 320 rotates. When the vent valve 210 is in the OFF state, the push rod 332 is retracted, and the abutted section 323 is pushed against by an elastic force of the return spring 340, so that the clamp seat 320 is rotated and reset.

Figure 8:
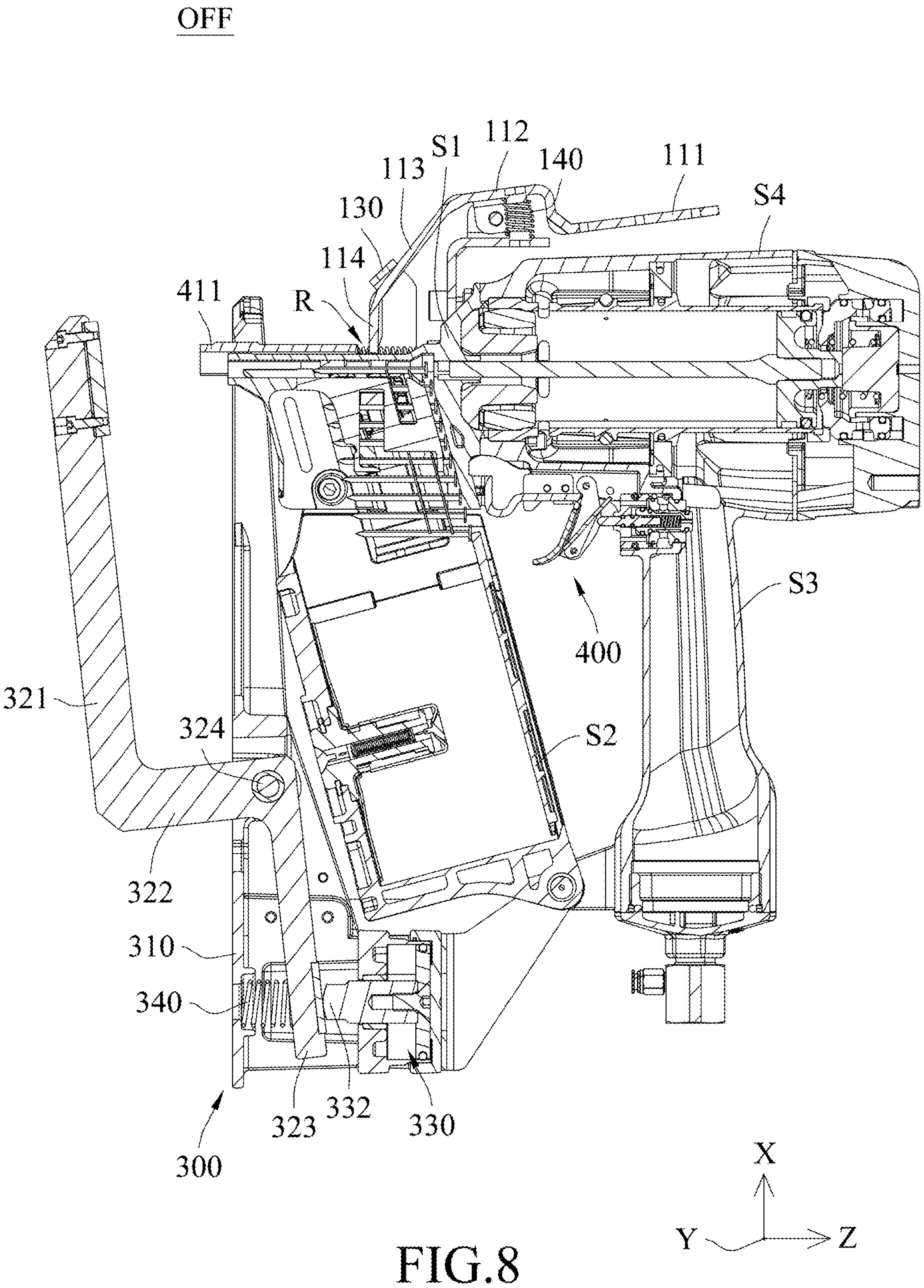
FIG. 8 is a cross-sectional view of the safety device of the nail gun of the invention in a safe state.
Figure 9:
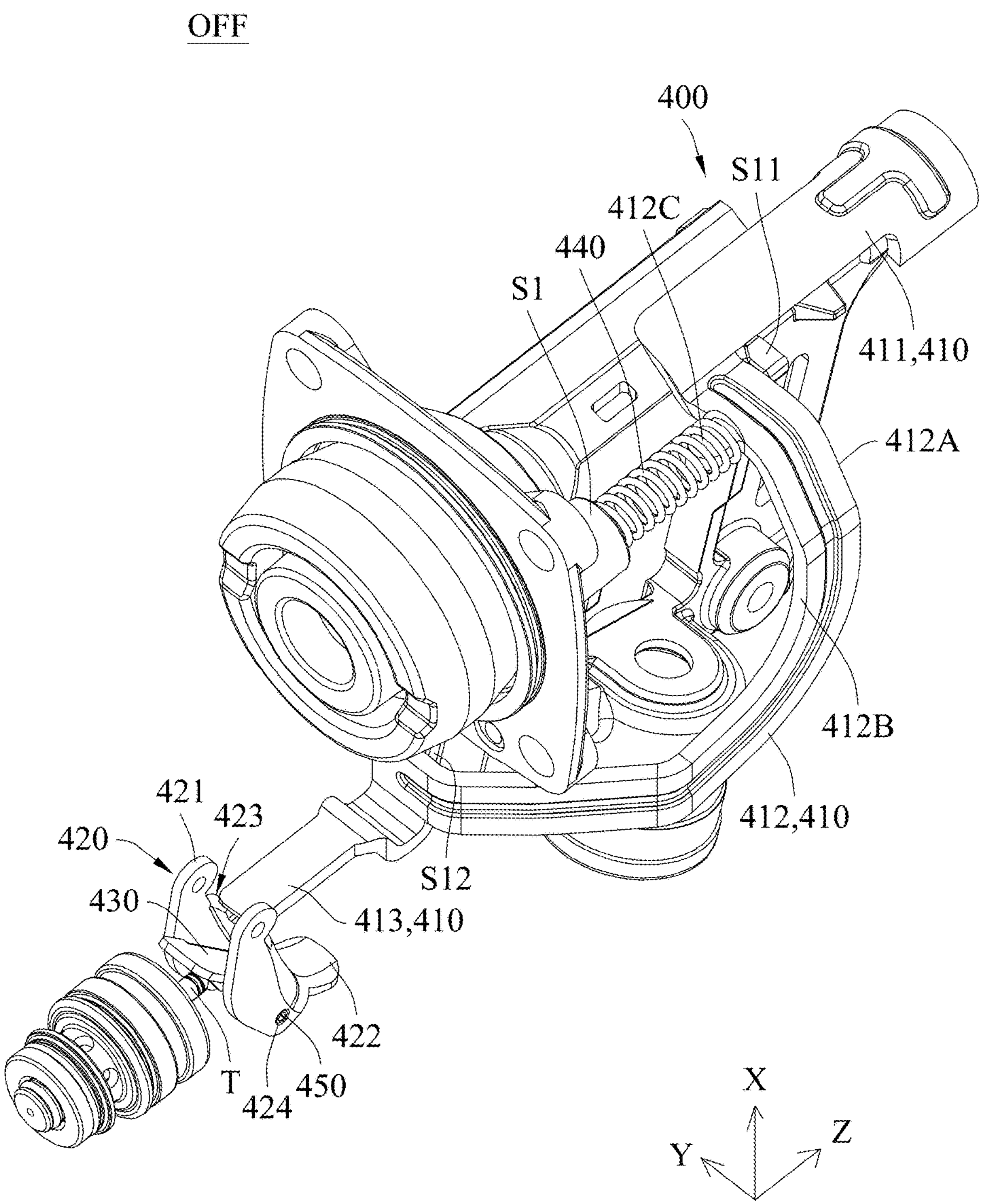
FIG. 9 is a perspective view of a trigger module of the invention in the safe state.
Figure 10:
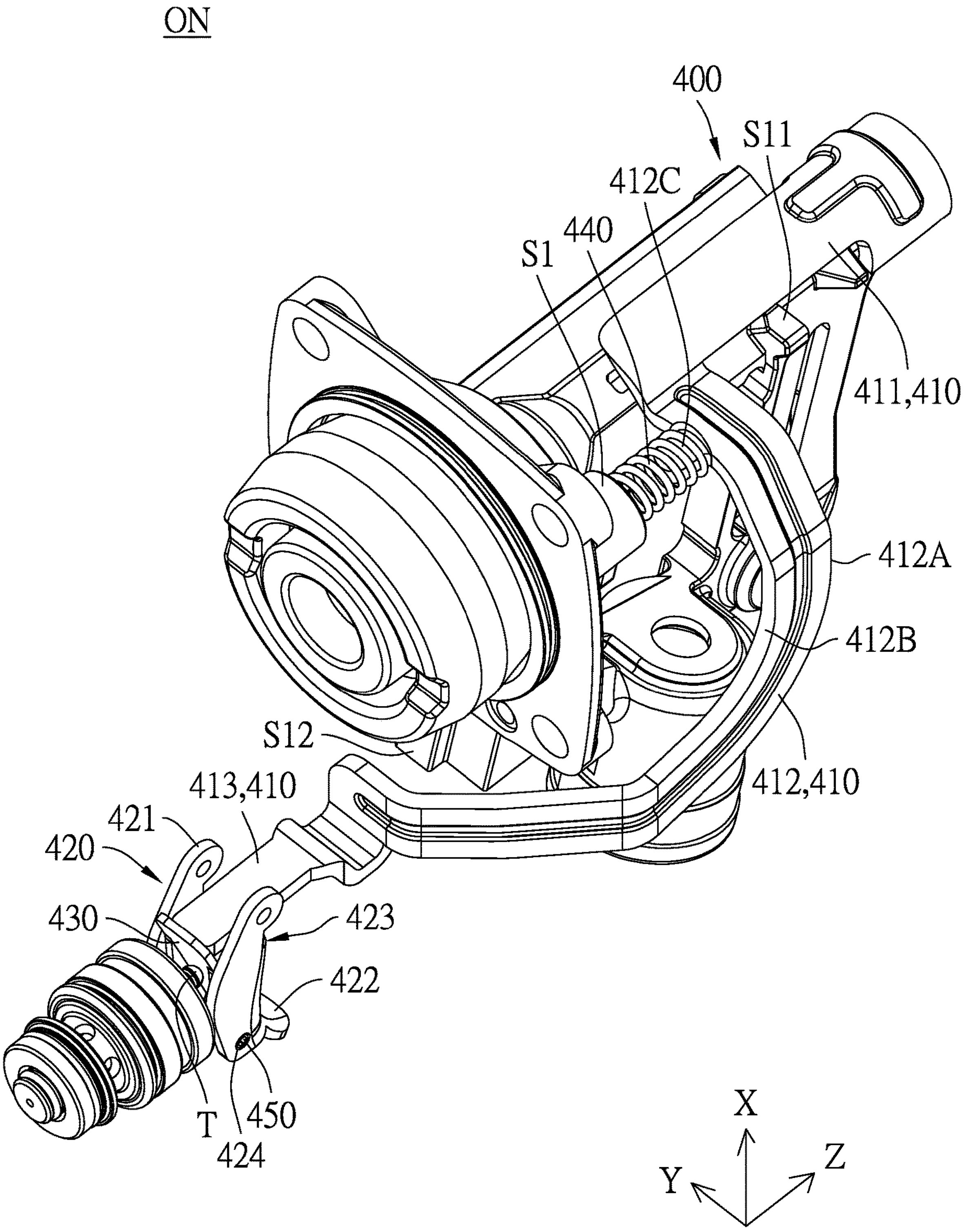
FIG. 10 is a perspective view of the trigger module of the invention in the actuated state.

Please refer to FIGS. 9 and 10, the trigger module 400 comprises an abutting member 410, a trigger 420, a safety member 430 and a pressing spring 440. The abutting member 410 is capable of displacing along the height direction Z to cause the trigger module 400 to switch between an actuated state ON and a safe state OFF. The abutting member 410 has an abutting section 411, a relay section 412 and a pushing section 413 connected in sequence, the abutting section 411 is roughly arc-shaped, and the relay section 412 is connected to one end of the abutting section 411. Please refer to FIG. 7, another end of the abutting section 411 is provided for abutting against a to-be-nailed object Q, the abutting section 411 is provided to be pushed against by the to-be-nailed object Q to cause the abutting member 410 to displace along the height direction Z, and the trigger module 400 is switched from the safe state OFF to the actuated state ON. Please refer to FIG. 8, a path of the abutting section 411 displacing along the height direction Z is defined as a displacement path R. Please refer to FIG. 9, the relay section 412 is connected to one side of the abutting section 411. The relay section 412 is provided for abutting against a bearing part S11 of the nozzle S1 of the nail gun S. One end of the relay section 412 connected to the abutting section 411 abuts against the bearing part S11. The relay section 412 has a first end surface 412A and a second end surface 412B opposite to each other, the first end surface 412A abuts against the bearing part S11, and the second end surface 412B has a convex part 412C. One end of the pressing spring 440 is sleeved on the convex part 412C and abuts against the second end surface 412B, another end of the pressing spring 440 is provided for abutting against the nozzle S1 of the nail gun S. The abutting section 411 and the pushing section 413 extend along the height direction Z.

Please refer to FIG. 9, in a preferred embodiment, one end of the relay section 412 connected to the pushing section 413 abuts against a second bearing part S12 of the nozzle S1.

Figure 7:
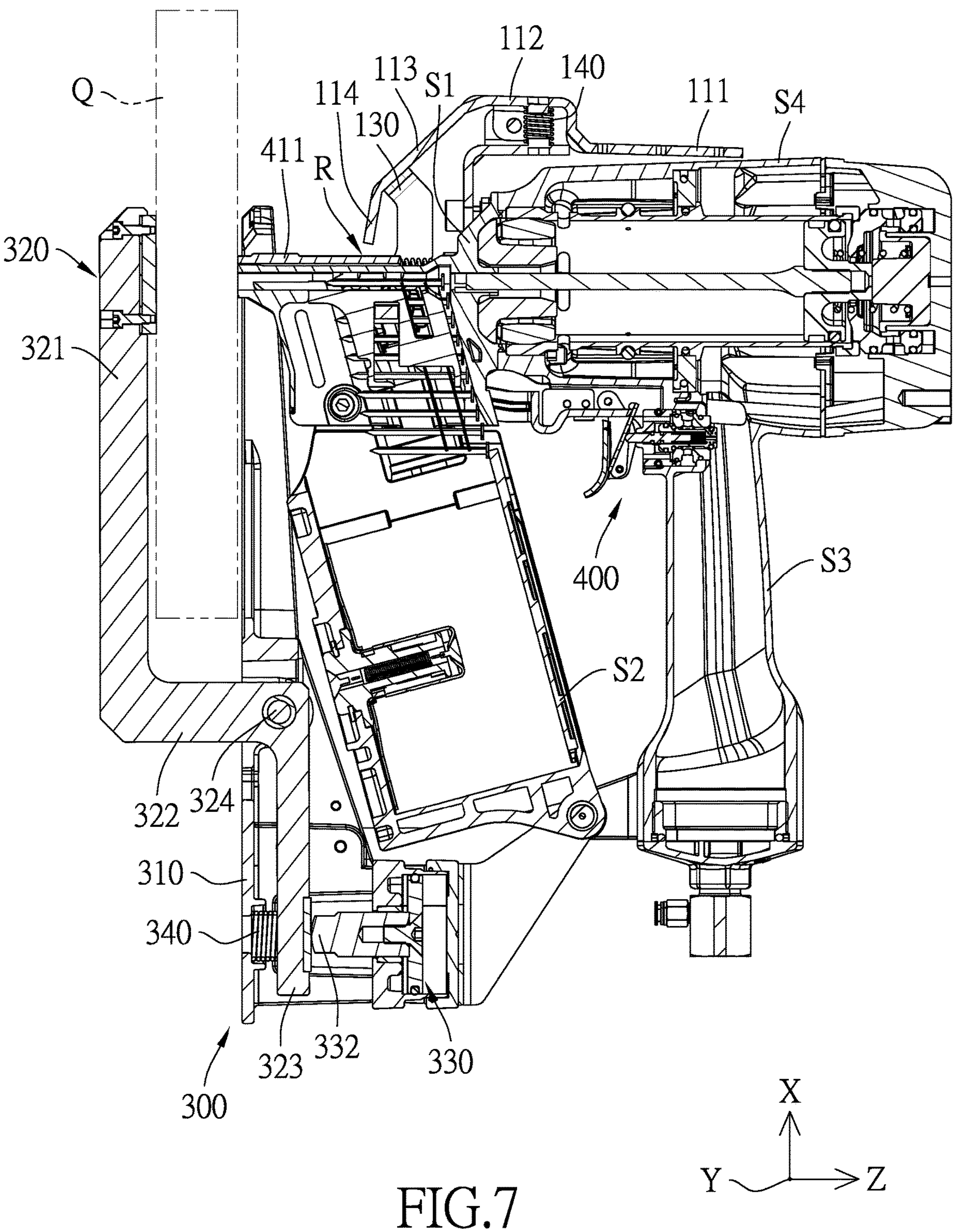
FIG. 7 is a cross-sectional view of the safety device of the nail gun of the invention in an actuated state.

Please refer to FIG. 7, when the user presses the pressing section 111, the stop section 114 is upturned, and the stop section 114 moves away from the displacement path R, so that the abutting section 411 is capable of displacing along the height direction Z. Please refer to FIG. 8, when the user releases the pressing section 111, the stop section 114 descends, and the stop section 114 moves to the displacement path R to stop the abutting section 411, so that the abutting section 411 is incapable of displacing along the height direction Z, and the trigger module 400 is incapable of switching from the safe state OFF to the actuated state ON.

Figure 11:
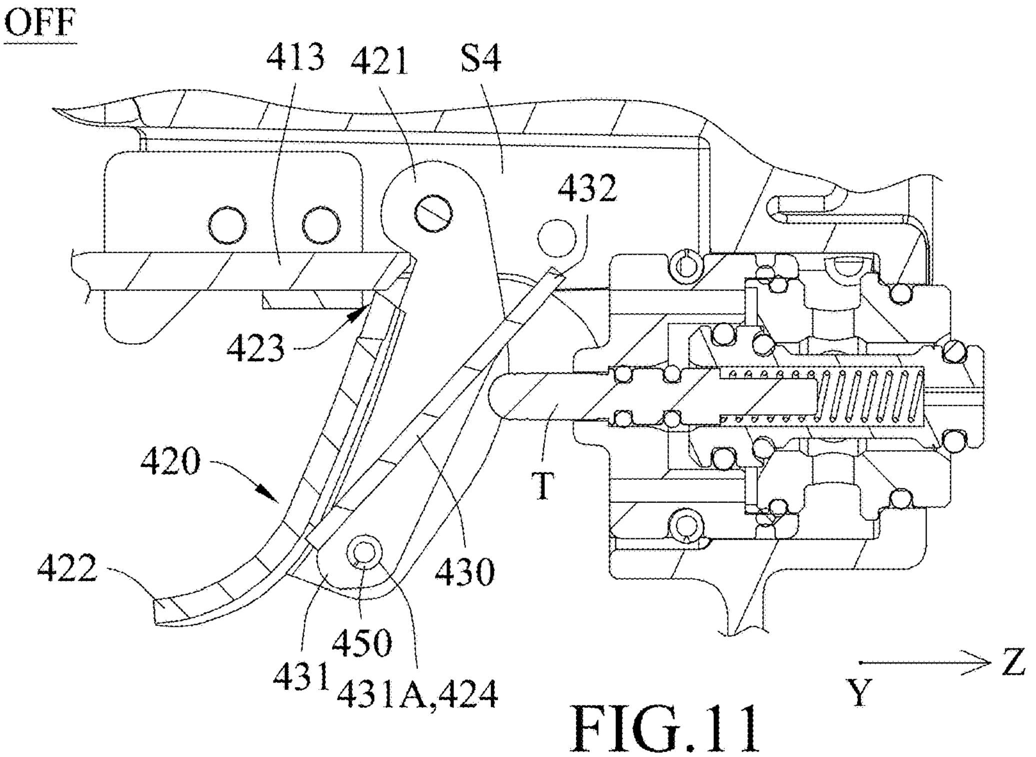
FIG. 11 is a schematic diagram of the trigger module of the invention in the safe state.
Figure 12:
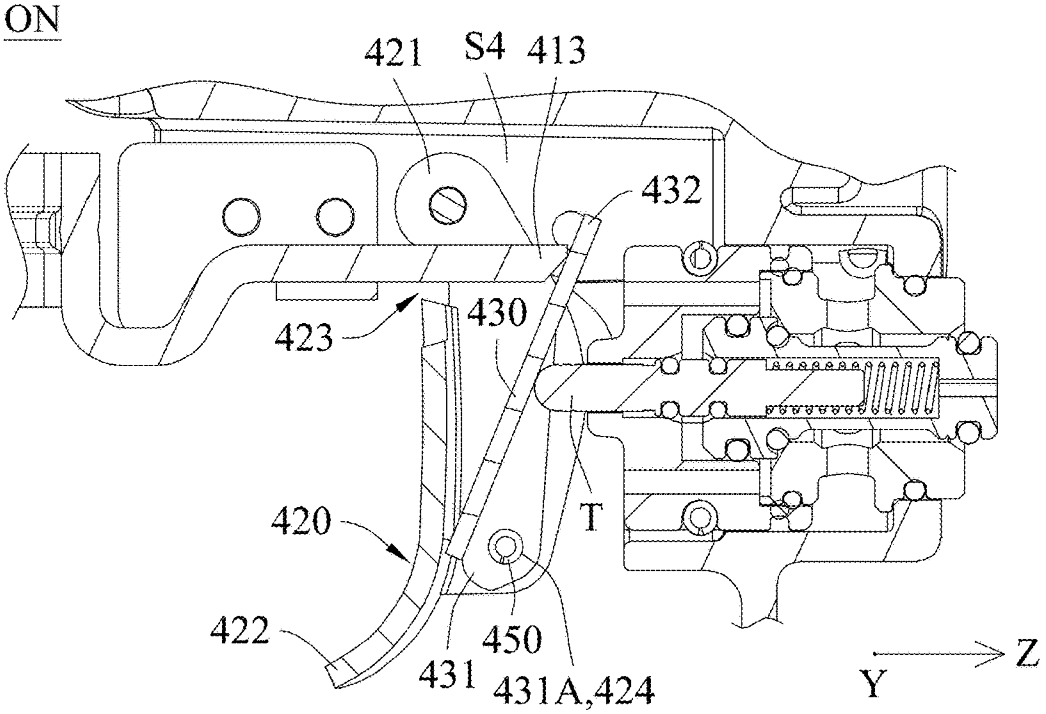
FIG. 12 is a schematic diagram of the trigger module of the invention in the actuated state.

Please refer to FIGS. 11 and 12, the trigger 420 has a first pivoting end 421 and a pressing end 422 opposite to each other. The first pivoting end 421 is pivotally disposed on the cylinder shell S4 of the nail gun S. The pressing end 422 is provided for the user to press. The trigger 420 has a passage 423 between the first pivoting end 421 and the pressing end 422. The passage 423 is closer to the first pivoting end 421 and farther away from the pressing end 422. The trigger 420 has two first through holes 424 between the first pivoting end 421 and the pressing end 422, the two first through holes 424 are closer to the pressing end 422 and farther away from the first pivoting end 421.

The safety member 430 has a second pivoting end 431 and an abutted end 432 opposite to each other. The second pivoting end 431 is pivotally mounted on the trigger 420. The second pivoting end 431 has a second through hole 431A, and a bolt 450 is provided for inserting into the two first through holes 424 and the second through hole 431A, so that the second pivoting end 431 is pivotally mounted on the trigger 420. A position of the abutted end 432 corresponds to a position of the passage 423. Please refer to FIG. 12, when the trigger module 400 is in the actuated state ON, the pushing section 413 passes through the passage 423 and abuts against the abutted end 432 to press the safety member 430 against a switch T. When the user presses the pressing end 422 of the trigger 420, since the safety member 430 is tightly abutted against the switch T, the trigger 420 is capable of further driving the safety member 430 to press against the switch T to actuate the nail gun S. Please refer to FIG. 11, when the trigger module 400 is in the safe state OFF, the pushing section 413 moves away from the abutted end 432, so that the safety member 430 is not pressed against the switch T. Since the second pivoting end 431 of the safety member 430 is pivotally mounted on the trigger 420, when the user presses the pressing end 422 of the trigger 420, the safety member 430 pivots relatively to the trigger 420, thereby keeping the safety member 430 in a state of not pressing against the switch T to ensure that the nail gun S will not be triggered.

Figure 2:
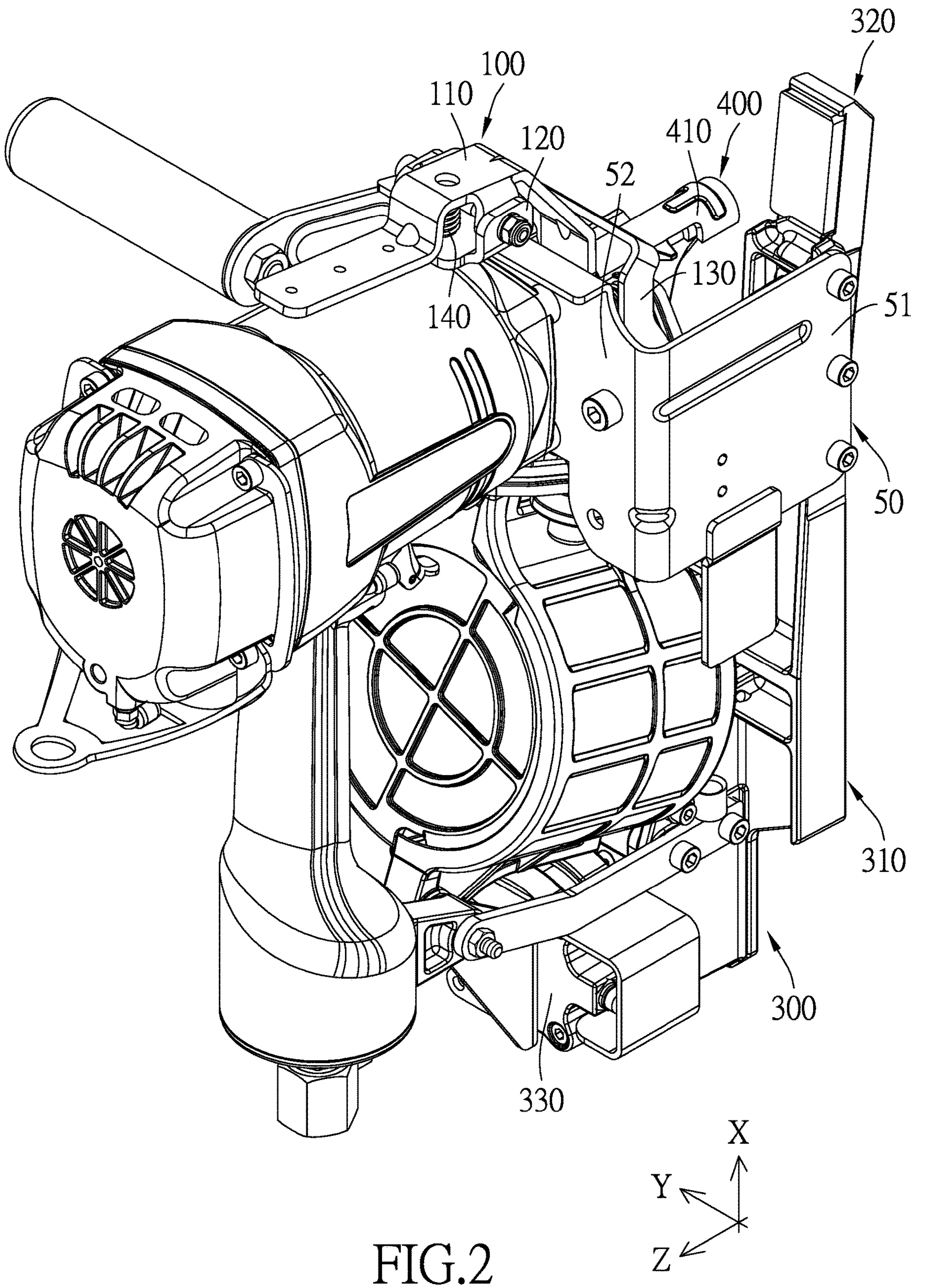
FIG. 2 is a perspective view of the safety device of the nail gun of the invention viewed from another angle.

Please refer to FIG. 2, in a preferred embodiment, the safety device of the nail gun S of the invention further has a fixing plate 50, the fixing plate 50 is locked on the nozzle S1 of the nail gun S. The assembly seat 120, the vent valve 210 and the base 310 are locked on the fixing plate 50, so that the safety device of the nail gun of the invention can be installed on the nail gun S in a modular manner.

Please refer to FIG. 2 for specific description. The fixing plate 50 has a first plate part 51 and a second plate part 52 connected in sequence, extending directions of the first plate part 51 and the second plate part 52 are perpendicular to each other, the assembly seat 120 is mounted on the second plate part 52, the vent valve 210 is mounted on the second plate part 52, and the base 310 is locked on the first plate part 51.

The above is the description of the embodiments, the main components and configurations of the invention, and operation modes and efficacies thereof will be described below.

Please refer to FIG. 4, when the user presses the pressing section 111, the pressing member 110 rotates around the first bolt 123 as a pivot center, and compresses the elastic member 140 to cause the extension section 113 and the stop section 114 to upturn. The extension section 113 drives the connecting member 130 to upturn, and the connecting member 130 drives the valve rod 212 to retract to cause the vent valve 210 to be in the ON state. Please refer to FIG. 7, when the vent valve 210 is in the ON state, the vent valve 210 is provided for controlling ventilation to drive the push rod 332 to abut against the abutted section 323 and compress the return spring 340, so that the clamp seat 320 rotates, and the clamping section 321 moves close to the abutting section 411 of the abutting member 410. If the to-be-nailed object Q is provided between the abutting section 411 and the clamping section 321 at this time, the clamping section 321 clamps the to-be-nailed object Q and pushes the to-be-nailed object Q against the abutting section 411 to cause the abutting section 411 to displace upward along the height direction Z, and the trigger module 400 is switched from the safe state OFF to the actuated state ON. Please refer to FIGS. 10 and 12, when the abutting section 411 displaces upward along the height direction Z, the pushing section 413 passes through the passage 423 and abuts against the abutted end 432 to cause the safety member 430 to abut against the switch T. Thereby when the user presses the pressing end 422 of the trigger 420, the trigger 420 is capable further driving the safety member 430 to press against the switch T to actuate the nail gun S.

Please refer to FIG. 4, conversely, when the user is not pressing the pressing section 111, the elastic member 140 pushes against the butting section 112 so that the extension section 113 and the stop section 114 remain in a drooping state. Please refer to FIG. 8, at this time, the stop section 114 is located on the displacement path R, and the extension section 113 drives the connecting member 130 to maintain a drooping state, so that the valve rod 212 protrudes from the body 211 to cause the vent valve 210 to be in the OFF state. When the vent valve 210 is in the OFF state, the vent valve 210 is provided for controlling cut-off of air to drive the push rod 332 to retract. The return spring 340 abuts against the abutted section 323 to cause the abutted section 323 to upturn, so that the clamping section 321 moves away from the abutting section 411 of the abutting member 410. The clamping section 321 cannot clamp the to-be-nailed object Q, and the abutting section 411 cannot move upward along the height direction Z, thereby the trigger module 400 remains in the safe state OFF. Please also refer to FIGS. 9 and 11. Since the abutting section 411 is not displacing upward along the height direction Z, the pushing section 413 moves away from the abutted end 432, so that the safety member 430 is not pressed against the switch T. Thereby, when the user presses the pressing end 422 of the trigger 420, the safety member 430 pivots relative to the trigger 420 to keep the safety member 430 in a state of not pressing the switch T to ensure that the nail gun S will not be triggered.

Further, please refer to FIG. 8, since when the user is not pressing the pressing section 111, the stop section 114 is located on the displacement path R, even if the user's hand contacts the abutting section 411 unintentionally, the abutting section 411 will be stopped by the stop section 114 and cannot move upward along the height direction Z to ensure that the trigger module 400 cannot switch from the safe state OFF to the actuated state ON. In this way, if the user accidentally presses the trigger 420 again, the switch T cannot be triggered, and therefore the nail gun S cannot be triggered to ensure the safety of the user.

In addition, even if the stop section 114 cannot smoothly stop the abutting section 411 from displacing upward due to gravity or force exerted by the user, as long as the pressing section 111 is not pressed, and the vent valve 210 is in the OFF state, the nail gun S will not be triggered even if the trigger 420 is accidentally contacted.

To sum up, in using the safety device of the nail gun of the invention, when the to-be-nailed object Q is positioned between the abutting section 411 and the clamping section 321, the user must ensure to press the pressing section 111 with one hand and press the trigger 420 with another hand to be capable of effectively triggering the nail gun S. Therefore, the user must follow safe operating procedures to ensure the safety of using the nail gun S.

Although the specific embodiments of the invention are disclosed in the above implementation modes, they are not intended to limit the invention. The specification relating to the above embodiments should be construed as exemplary rather than as limitative of the invention, with many variations and modifications being readily attainable by a person having ordinary skill in the art to which the invention pertains without departing from the principles and spirit thereof as defined by the appended claims and their legal equivalents.

What is claimed is:

1. A safety device of a nail gun comprising:

a pressing module, a pneumatic module, a clamp linkage assembly and a trigger module;

the pressing module comprising a pressing member and a connecting member, the pressing member having a pressing section, an extension section and a stop section;

the connecting member having a driving end and a linkage end opposite to each other, the driving end being connected to the extension section;

the pneumatic module comprising a vent valve and at least one vent tube, the at least one vent tube being connected to the vent valve, the at least one vent tube being connected to the clamp linkage assembly, the vent valve having a body and a valve rod, one end of the valve rod extending into the body, another end of the valve rod being connected to the linkage end of the connecting member, the valve rod being capable of displacing relative to the body, the at least one vent tube being connected to the body;

the clamp linkage assembly comprising a base, a clamp seat and a pneumatic cylinder, the clamp seat being pivotally disposed on the base, the clamp seat having a clamping section and an abutted section, the pneumatic cylinder having an air intake part and a push rod, the air intake part being connected to the at least one vent tube, the push rod being provided for moving and abutting against the abutted section to pivot the clamp seat to cause the clamping section to approach or move away from the trigger module;

the trigger module comprising an abutting member, a trigger and a safety member, the abutting member being capable of displacing to cause the trigger module to switch between an actuated state and a safe state, the abutting member having an abutting section and a pushing section, the abutted section being provided for driving the abutting section to displace, defining a path of displacement of the abutting section as a displacement path, the stop section being provided for moving into the displacement path or moving away from the displacement path;

the trigger having a first pivoting end and a pressing end opposite to each other, the trigger having a passage between the first pivoting end and the pressing end, the passage being closer to the first pivoting end; and the safety member having a second pivoting end and an abutted end opposite to each other, the second pivoting end being pivotally disposed on the trigger, a position of the abutted end corresponding to a position of the passage, when the trigger module is in the actuated state, the pushing section passes through the passage and abuts against the abutted end, when the trigger module is in the safe state, the pushing section moves away from the abutted end.

2. The safety device of the nail gun as claimed in claim 1, wherein the pressing module further comprises an assembly seat, and the pressing member is pivotally mounted on the assembly seat.

3. The safety device of the nail gun as claimed in claim 2, wherein the pressing member further has a butting section, the butting section is connected between the pressing section and the extension section, two opposite sides of the butting section respectively extend to form a side locking part, the side locking parts respectively have a first lock hole, the assembly seat has a main body and two side extensions, the two side extensions respectively extend from two opposite sides of the main body, the two side extensions respectively have a second lock hole, the two side extensions respectively abut against the two side locking parts, the second lock hole is aligned with the first lock hole, the assembly seat further has a first bolt and a first nut, the first bolt is inserted into the two first lock holes and the two second lock holes and is locked with the first nut.

4. The safety device of the nail gun as claimed in claim 3, wherein the pressing module further comprises an elastic member, the elastic member is disposed between the main body and the butting section, one end of the elastic member abuts against the main body, another end of the elastic member abuts against the butting section, the butting section has a first end and a second end opposite to each other, the first end is connected to the pressing section, the second end is connected to the extension section, the elastic member is closer to the first end and farther away from the second end, and the elastic member is closer to the first end than the side locking part.

5. The safety device of the nail gun as claimed in claim 4, wherein the main body has a protruded column, the protruded column faces the butting section, the protruded column is closer to the pressing section than the two side extensions, and one end of the elastic member is sleeved on the protruded column.

6. The safety device of the nail gun as claimed in claim 2 further comprising a fixing plate, and the assembly seat, the vent valve and the base being locked on the fixing plate.

7. The safety device of the nail gun as claimed in claim 6, wherein the fixing plate has a first plate part and a second plate part connected to each other, the assembly seat is mounted on the second plate part, the vent valve is mounted on the second plate part, and the base is locked on the first plate part.

8. The safety device of the nail gun as claimed in claim 1, wherein the base comprises a bottom plate, the bottom plate has a through hole, the clamp seat has a connecting section connected between the clamping section and the abutted section, and the connecting section is inserted into the through hole.

9. The safety device of the nail gun as claimed in claim 8, wherein the base further comprises two side walls, the bottom plate has a top side and a bottom side opposite to each other, the two side walls extend from the top side, a distance is provided between the two side walls, the two side walls respectively have an assembling hole, the connecting section has a pivot hole, the pivot hole is aligned with the two assembling holes, and a pivot bolt is inserted into the two assembling holes and the pivot hole.

10. The safety device of the nail gun as claimed in claim 9, wherein the clamp linkage assembly further comprises a return spring, one end of the return spring abuts against the top side of the bottom plate, and another end of the return spring abuts against the abutted section.

11. The safety device of the nail gun as claimed in claim 9, wherein one end of each of the two side walls that is not connected to the bottom plate has a plurality of screw holes, the pneumatic cylinder is locked on the screw holes by a plurality of bolts, and the pneumatic cylinder is fixed on the two side walls.

12. The safety device of the nail gun as claimed in claim 1, wherein the abutting member has a relay section, the relay section is connected between the abutting section and the pushing section, and the relay section has a first end surface.

13. The safety device of the nail gun as claimed in claim 12, wherein the relay section has a second end surface opposite to the first end surface, the second end surface has a convex part, the trigger module further comprises a pressing spring, and one end of the pressing spring is sleeved on the convex part and abuts against the second end surface.

14. The safety device of the nail gun as claimed in claim 1, wherein the trigger has two first through holes between the first pivoting end and the pressing end, the two first through holes are closer to the pressing end and farther away from the first pivoting end, the second pivoting end has a second through hole, and a bolt is provided for inserting into the two first through holes and the second through hole.

15. The safety device of the nail gun as claimed in claim 1, wherein the at least one vent tube comprises a plurality of vent tubes, at least one of the vent tubes is provided for connecting with an air supply source, and at least one of the vent tubes is connected to the clamp linkage assembly.

* * * * *